US010240771B2

(12) United States Patent
Murphy et al.

(10) Patent No.: US 10,240,771 B2
(45) Date of Patent: Mar. 26, 2019

(54) LED LAMP WITH SENSING CAPABILITIES (71) Applicant: ProPhotonix Limited, Salem, NH (US)

(72) Inventors: Karol Murphy, Cork (IE); Peter Panek, Douglas (IE)

(73) Assignee: ProPhotonix Limited, Salem, NH (US)

( * ) Notice: Subject to any disclaimer, the term of this patent is extended or adjusted under 35 U.S.C. 154(b) by 0 days.

(21) Appl. No.: 15/934,076

(22) Filed: Mar. 23, 2018

(65) Prior Publication Data

US 2018/0209633 A1 Jul. 26, 2018

Related U.S. Application Data (62) Division of application No. 15/254,801, filed on Sep. 1, 2016.

(60) Provisional application No. 62/213,443, filed on Sep. 2, 2015.

(51) Int. Cl.
*F21V 29/70* (2015.01)
*G01J 1/04* (2006.01)
*F21V 17/10* (2006.01)
*F21V 23/00* (2015.01)
*F21V 8/00* (2006.01)
*F21Y 115/10* (2016.01)
*F21Y 113/13* (2016.01)
*G01J 1/42* (2006.01)
*B41J 11/00* (2006.01)

(52) U.S. Cl.
CPC ............ *F21V 29/70* (2015.01); *F21V 17/101* (2013.01); *F21V 17/107* (2013.01); *F21V 23/005* (2013.01); *G01J 1/0407* (2013.01); *G01J 1/0422* (2013.01); *G02B 6/0096* (2013.01); *B41J 11/002* (2013.01); *F21Y 2113/13* (2016.08); *F21Y 2115/10* (2016.08); *G01J 2001/4252* (2013.01)

(58) Field of Classification Search
CPC ...... F21V 29/70; F21V 17/101; F21V 17/107; F21V 23/005; G01J 1/0422; G01J 1/0407; G01J 2001/4252; G02B 6/0096; F21Y 2115/10; F21Y 2113/13
See application file for complete search history.

(56) References Cited

U.S. PATENT DOCUMENTS

| | | | |
|---|---|---|---|
| 2,450,330 A | 9/1948 | Giers | |
| 3,947,131 A | 3/1976 | Karl | |
| 4,798,956 A | 1/1989 | Hochstein | |
| 4,867,561 A | 9/1989 | Fujii et al. | |
| 5,714,802 A * | 2/1998 | Cloud | H01L 25/0657 257/723 |
| 5,724,140 A | 3/1998 | Haywood | |
| 6,998,650 B1 | 2/2006 | Wu | |
| 7,157,840 B2 | 1/2007 | Fujishima et al. | |
| 7,245,367 B2 | 7/2007 | Miller et al. | |
| 7,465,909 B2 | 12/2008 | Siegel | |
| 7,948,617 B2 | 5/2011 | Shubinsky et al. | |

(Continued)

FOREIGN PATENT DOCUMENTS

DE 102012013894 1/2014

*Primary Examiner* — Tracie Y Green
(74) *Attorney, Agent, or Firm* — Pandiscio & Pandiscio (57) ABSTRACT A novel LED lamp comprising: a lamp body; an LED mounted to the lamp body; an outer (exit) window; and a hinged clamp for releasably mounting the outer (exit) window to the lamp body such that light emitted from the LED passes through the outer (exit) window.

11 Claims, 12 Drawing Sheets

(56) References Cited

U.S. PATENT DOCUMENTS

| | | |
|---|---|---|
| 7,948,628 B2 * | 5/2011 | Laluvein .................. G01J 1/04 356/445 |
| 7,988,334 B2 | 8/2011 | Cheng et al. |
| 8,038,282 B2 | 10/2011 | Claeys |
| 8,113,687 B2 | 2/2012 | Villard et al. |
| 8,376,583 B2 | 2/2013 | Wang et al. |
| 8,378,322 B2 | 2/2013 | Dahm et al. |
| 8,425,065 B2 | 4/2013 | Ravillisetty et al. |
| 8,444,918 B2 | 5/2013 | Tanaka |
| 8,581,269 B2 | 11/2013 | Kuk et al. |
| 8,764,237 B2 | 7/2014 | Wang et al. |
| 8,770,806 B2 | 7/2014 | Keo et al. |
| 8,873,062 B2 | 10/2014 | Adler et al. |
| 8,931,928 B2 | 1/2015 | Heintz |
| 9,001,318 B2 | 4/2015 | Schmalz |
| 9,016,892 B1 | 4/2015 | Scribante et al. |
| 9,016,895 B2 | 4/2015 | Handsaker |
| 9,169,998 B2 | 10/2015 | Heintz |
| 9,239,146 B2 | 1/2016 | Walker et al. |
| 9,279,772 B2 * | 3/2016 | Sacquard ............... G01N 21/15 |
| 9,346,288 B2 | 5/2016 | Childers |
| 9,360,177 B2 | 6/2016 | Mueckl et al. |
| 9,466,773 B2 | 10/2016 | Streppel et al. |
| 9,488,331 B2 | 11/2016 | Sharrah |
| 9,512,969 B1 | 12/2016 | Watson |
| 9,568,665 B2 | 2/2017 | Petluri et al. |
| 9,625,127 B2 | 4/2017 | Thomsen et al. |
| 9,651,216 B2 | 5/2017 | Rodgers et al. |
| 9,662,906 B2 | 5/2017 | Kobayashi |
| 2008/0272319 A1 * | 11/2008 | Keh .......................... G01J 1/04 250/552 |
| 2011/0290179 A1 | 12/2011 | Stowell et al. |
| 2012/0257374 A1 | 10/2012 | Daniel |
| 2013/0201700 A1 * | 8/2013 | Tamura .................. F21V 23/02 362/382 |
| 2014/0246611 A1 | 9/2014 | Sacquard et al. |
| 2015/0034545 A1 | 2/2015 | Park et al. |
| 2015/0049486 A1 | 2/2015 | Jung et al. |
| 2015/0082655 A1 | 3/2015 | Rae et al. |
| 2016/0051719 A1 | 2/2016 | Watanabe et al. |
| 2016/0102845 A1 | 4/2016 | Scribante et al. |
| 2016/0208998 A1 | 7/2016 | Greinke |
| 2016/0220922 A1 | 8/2016 | Kamen et al. |
| 2016/0296650 A1 | 10/2016 | Liao et al. |
| 2017/0016589 A1 | 1/2017 | Greinke |
| 2017/0021652 A1 | 1/2017 | Gottschalt et al. |
| 2017/0144899 A1 | 5/2017 | Braunberger |
| 2017/0152158 A1 | 6/2017 | Braunberger |

* cited by examiner

LED LAMP WITH SENSING CAPABILITIES

REFERENCE TO PENDING PRIOR PATENT APPLICATIONS

This patent application is a division of pending prior U.S. patent application Ser. No. 15/254,801, filed Sep. 1, 2016 by ProPhotonix Limited for LED LAMP WITH SENSING CAPABILITIES, which patent application claims benefit of prior U.S. Provisional Patent Application Ser. No. 62/213,443, filed Sep. 2, 2015 by ProPhotonix Limited and Karol Murphy et al. for LED LAMP WITH SENSING CAPABILITIES.

The two (2) above-identified patent applications are hereby incorporated herein by reference.

FIELD OF THE INVENTION

This invention relates to lighting devices in general, and more particularly to a novel LED lamp which comprises novel sensing elements to manage the real-time operation of the LED lamp and a novel mechanism enabling easy replacement of an outer (exit) window of the LED lamp.

BACKGROUND OF THE INVENTION

LED illumination offers significant benefits over traditional lamp technologies including, but not limited to, longer illuminator lifetimes, more stable light output over illuminator lifetimes, ozone-free output, more precise lighting control, better thermal management to keep heat from the target object and lower cost.

Visible- and IR-wavelength LED lamps for machine vision applications are sometimes used in dusty and/or chemically reactive environments. Recently, UV LED lamps have found use as an alternative technology to traditional lamps for curing applications. Inks, adhesives, polymers and coatings are often cured using UV light for printing, manufacturing and 3D printing applications. In certain environments, a build-up of material can form on the outer (exit) window of the lamp over time, resulting in a reduction in the intensity of light emitted by the lamp. By way of example, in printing applications, ink can build up over time on the outer (exit) window of the lamp and cure on the outer surface of the outer (exit) window. By way of further example, in the lamps used in optical sorting systems, layers of dirt or dust can form on the outer (exit) window of the lamp, leading to a reduction in intensity of the light emitted by the lamp.

Users typically address these issues by shutting down their systems and scraping (i.e., manually removing) the built-up material from the outer (exit) window of the lamp. This solution is not ideal, inasmuch as such scraping of the outer (exit) window of the lamp often results in a permanently scratched outer (exit) window which can affect the optical output profile of the lamp. Another solution which is sometimes used by users is to remove the outer (exit) window from the lamp (which may require the entire lamp to be removed from a production line) and then immerse the outer (exit) window in a chemical solution to remove the built-up material. This chemical cleaning method can take up to an hour to complete for some materials, for example, inks which are fully cured on a surface of a glass window. In commercial environments where down-time of systems incorporating LED lamps needs to be minimized, it would be desirable to provide a secure, but easily replaceable, outer (exit) window to facilitate ease of removal and cleaning, or outright replacement, of the outer (exit) window. It would be preferable if the outer (exit) window did not require screws (or similar tool-installed fasteners) in order to be secured to the remainder of the lamp, and could be easily changed by non-technical personnel working without tools (e.g., screwdrivers, Allen wrenches and the like).

Machine vision and UV-curing applications are very sensitive to changes in light intensity and uniformity. In general, for machine vision applications, the brighter the light, the faster the machine vision system can operate, and the better the machine vision system will perform. In UV-curing applications, it is very important to maintain the intensity and uniformity of the light at the user's specifications in order to ensure that the material being cured is cured to the appropriate level. Furthermore, it is important to notify the user when the intensity and uniformity of the light varies from the user's specifications. For this reason, a sensor detecting excessive build-up of material on the outer (exit) window surface of the lamp would be very useful.

Therefore, it would be desirable to provide a replaceable window system on an LED lamp that can be easily removed by non-technical personnel, minimizing the down-time of the lamp and hence minimizing the down-time of the overall system employing the lamp, as well as sensors and software to manage the intensity, uniformity, thermal feedback and lifetime of the lamp, including detecting excessive build-up of material on the outer (exit) window surface of the lamp.

SUMMARY OF THE INVENTION

The present invention comprises a novel LED lamp comprising a replaceable window system that can be easily removed by non-technical personnel, minimizing the down-time of the lamp and hence minimizing the down-time of the overall system employing the lamp, as well as sensors and software to manage the intensity, uniformity, thermal feedback and lifetime of the lamp, including detecting excessive build-up of material on the outer (exit) window surface of the lamp.

In one preferred form of the present invention, there is provided a novel LED lamp comprising:
 a lamp body;
 an LED mounted to the lamp body;
 an outer (exit) window; and
 a hinged clamp for releasably mounting the outer (exit) window to the lamp body such that light emitted from the LED passes through the outer (exit) window.

In another preferred form of the present invention, there is provided a novel method for producing light, the novel method comprising:
 providing a novel LED lamp comprising:
 a lamp body;
 an LED mounted to the lamp body;
 an outer (exit) window; and
 a hinged clamp for releasably mounting the outer (exit) window to the lamp body such that light emitted from the LED passes through the outer (exit) window; and
 driving the LED so that it emits light.

In another preferred form of the present invention, there is provided a novel LED lamp comprising:
 a lamp body;
 an LED mounted to the lamp body;
 an outer (exit) window comprising an edge surface;
 a photodetector; and
 a light pipe for transmitting light from the edge surface of the outer (exit) window to the photodetector.

In another preferred form of the present invention, there is provided a novel method for producing light, the novel method comprising:
  providing a novel LED lamp comprising:
  a lamp body;
  an LED mounted to the lamp body;
  an outer (exit) window comprising an edge surface;
  a photodetector; and
  a light pipe for transmitting light from the edge surface of the outer (exit) window to the photodetector; and
  driving the LED so that it emits light.

In another preferred form of the present invention, there is provided a novel LED lamp comprising:
  a lamp body comprising a heat sink having a front surface, a rear surface and a side surface extending between the front surface and the rear surface;
  an LED assembly mounted to the front surface of the heat sink, the LED assembly comprising a substrate and a plurality of LEDs mounted to the substrate; and
  a sensor assembly mounted to the LED assembly and extending from the front surface of the heat sink alongside the side surface of the heat sink, the sensor assembly comprising a flexible polyimide substrate and a plurality of sensing elements mounted to the flexible polyimide substrate.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENT

The present invention comprises a novel LED lamp comprising a replaceable window system that can be easily removed by non-technical personnel, minimizing the down-time of the lamp and hence minimizing the down-time of the overall system employing the lamp, as well as sensors and software to manage the intensity, uniformity, thermal feedback and lifetime of the lamp, including detecting excessive build-up of material on the outer (exit) window surface of the lamp.

Figure 1:
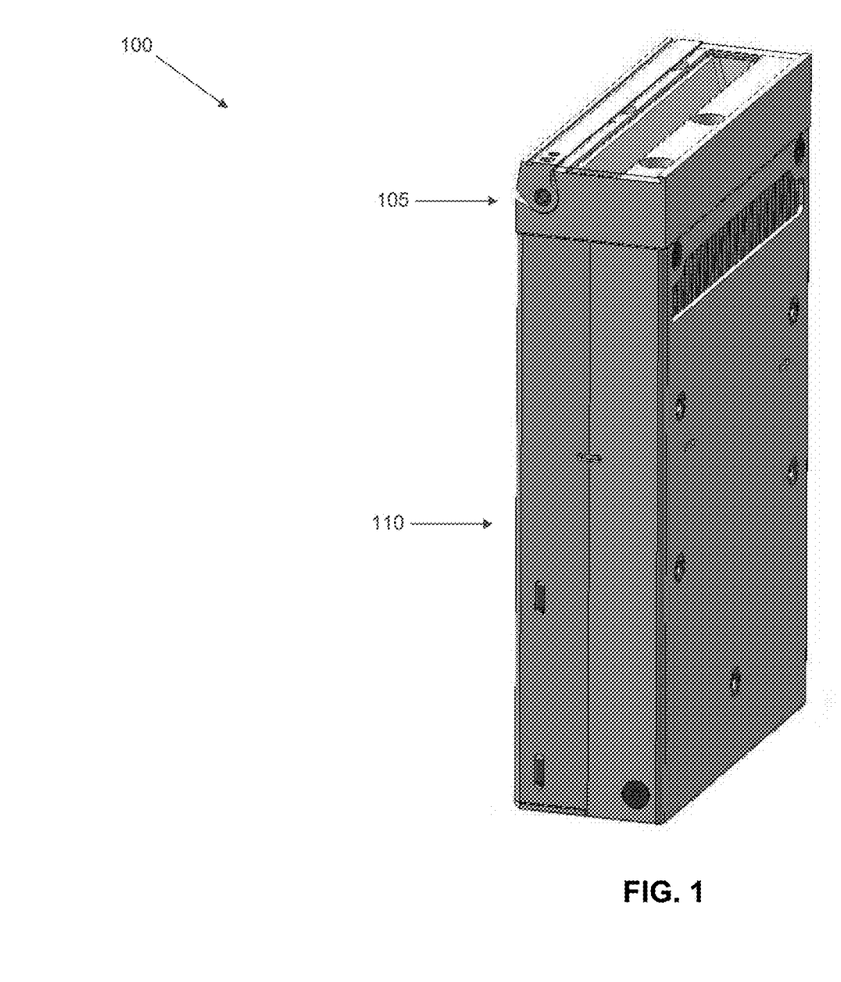
FIG. 1 is a schematic view of a novel LED lamp formed in accordance with the present invention.
Figure 2A:
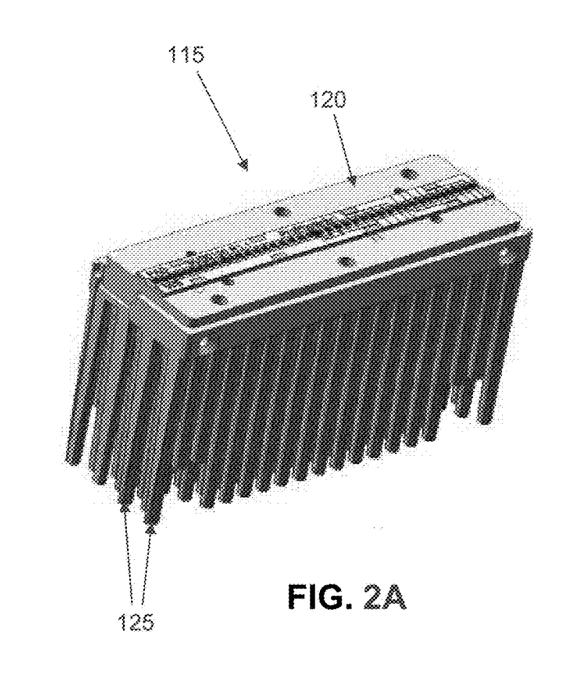
FIG. 2A is a schematic view showing a heat sink with an LED substrate attached.

More particularly, and looking first at FIG. 1, there is shown a novel LED lamp 100 which generally comprises a header section 105 and a housing section 110. LED lamp 100 is designed to be highly configurable according to a user's needs. Header section 105 can be configured with different LEDs, optical and mechanical configurations. Housing section 110 can be configured with different mounting holes, thermal management elements (e.g., heat sink, fan, etc.), printed circuit boards (PCBs), and communication port configurations. In one preferred form of the invention, and looking now at FIG. 2A, the thermal management elements of the lamp comprise a heat sink 115 which comprises an aluminum block 120 with staggered hexagonal pins 125. Those skilled in the art will understand that other heat sink configurations comprising heat-dissipating elements (e.g., finned heat sinks) may be used with the present invention.

Figure 2B:
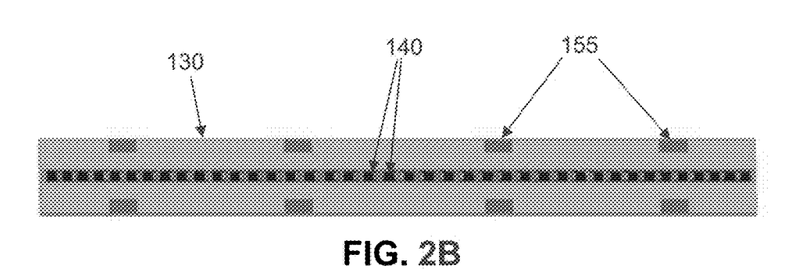
FIG. 2B is a schematic view of an LED substrate formed in accordance with the present invention.
Figure 2C:
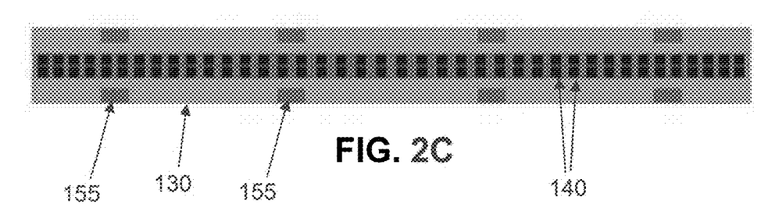
FIG. 2C is a schematic view of another LED substrate formed in accordance with the present invention.
Figure 3:
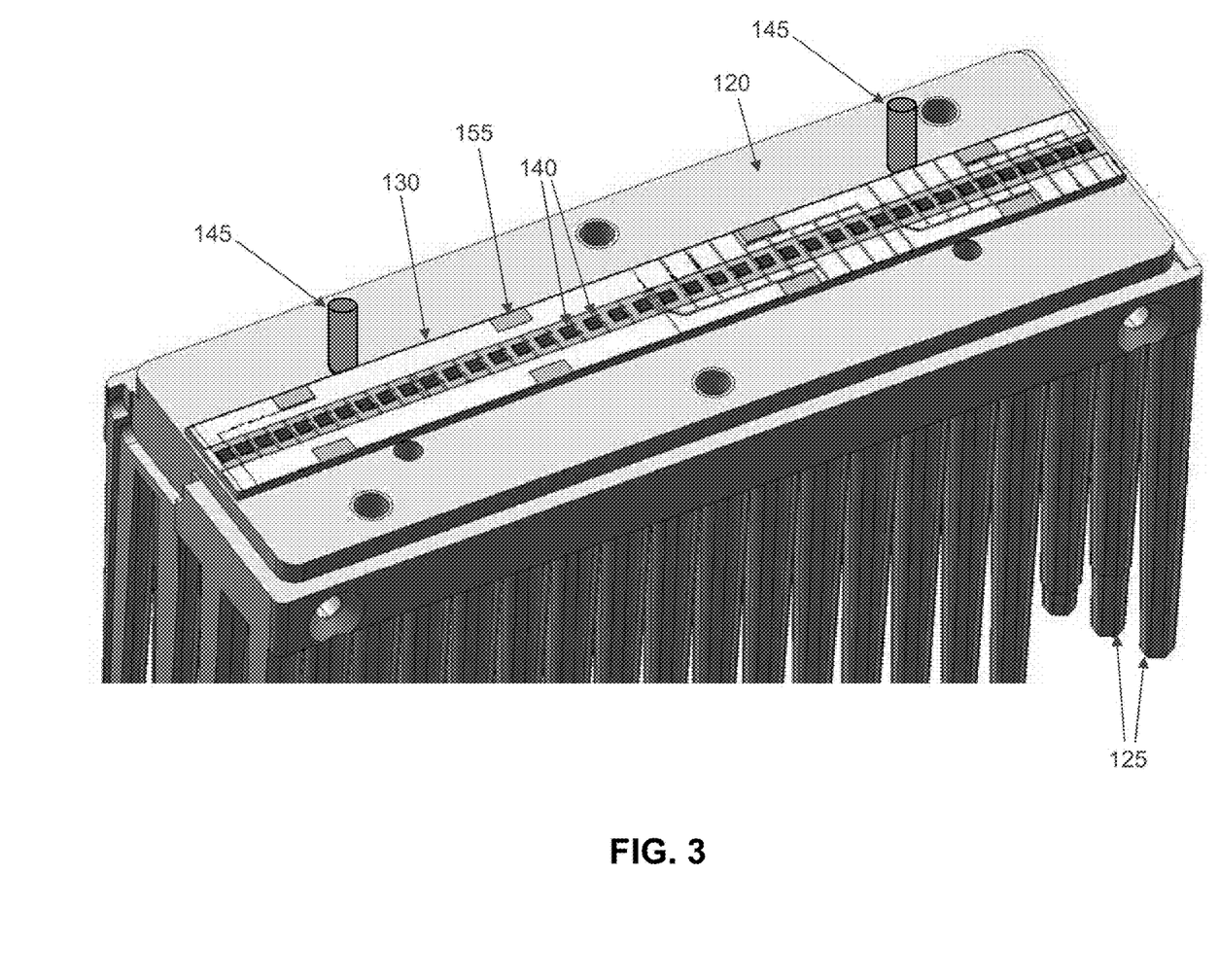
FIG. 3 is another schematic view showing a heat sink with an LED substrate attached.
Figure 4:
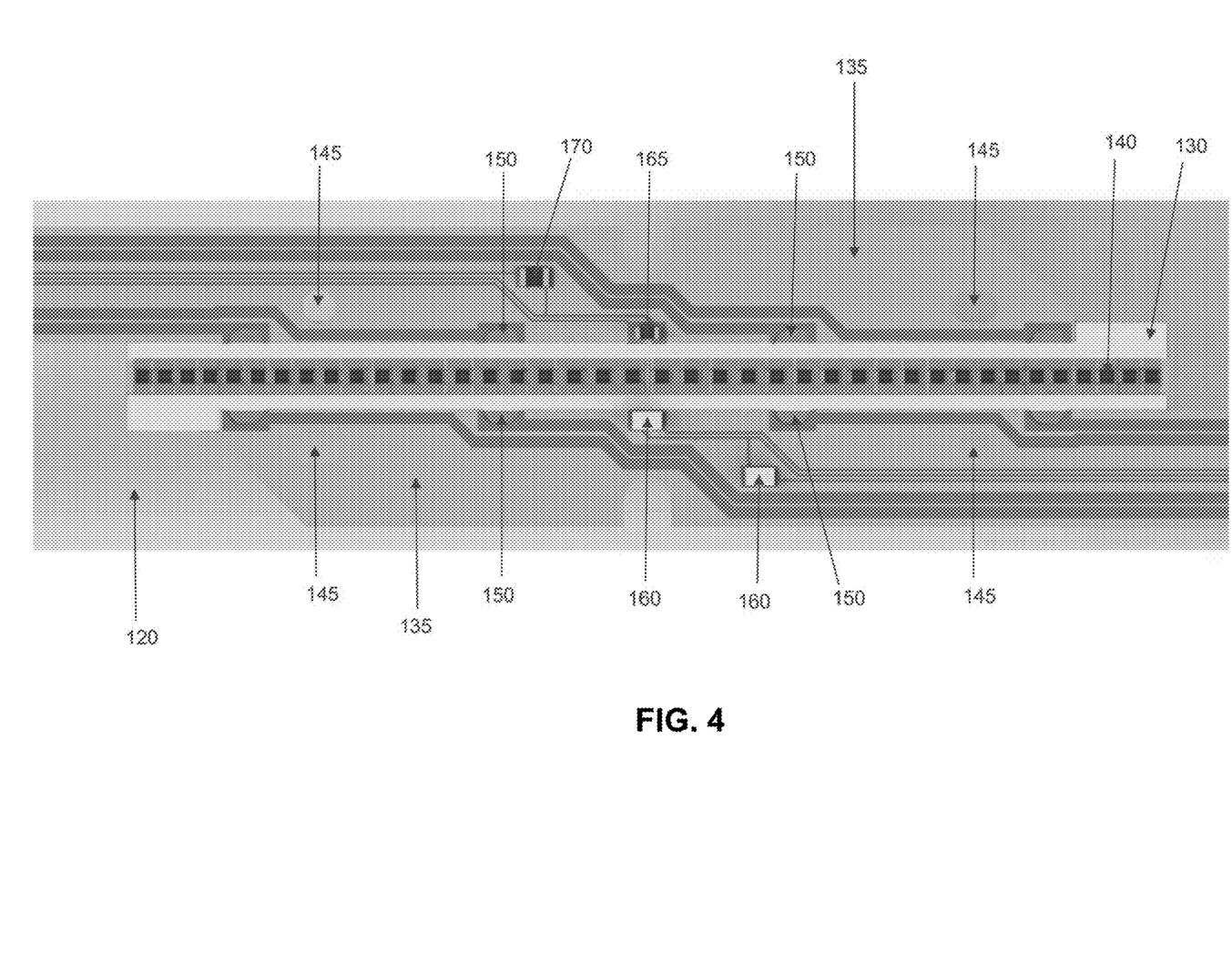
FIG. 4 is a schematic view showing an LED substrate and flexible polyimide connectors mounted to the top of a heat sink.

Looking next at FIGS. 1-4, header section 105 comprises an LED substrate 130, a flexible polyimide connector 135, various sensing elements (see below), and a reflector (see below), a fixed window (see below), a removable outer (exit) window (see below) and a hinge mechanism (see below). LED substrate 130 comprises LED chips 140 which are placed on the substrate by pick-and-place methods. LED substrate 130 can comprise FR4, IMS, aluminum nitride (ALN) or any other appropriate substrate. LED substrate 130 is preferably glued to heat sink 115 (see FIG. 2A). In the example shown in FIG. 2B, LED substrate 130 consists of 40 LEDs positioned in a "1-D" array across the substrate. However, LEDs can be arranged in alternative configurations such as staggered, hexagonal or multiple linear arrays. More than one LED can be placed on the same bonding pad (see FIG. 2C). The pitch (i.e., spacing) between the LEDs can be varied across the substrate so as to produce a particular light intensity profile. In FIGS. 2B and 2C, the LEDs 140 are shown as being placed further apart at the center of the substrate so as to improve light uniformity along the line of the optical output.

To maximize optical efficiency, it is desirable to place the optical lensing elements (see below) as close to LED substrate 130 as possible so as to maximize capture of the light emitted from the LEDs. In conventional LED-based lamps, a ribbon connector is utilized to connect the LEDs to a driver circuit in order to drive (i.e., energize) the LEDs. This conventional ribbon connector is placed directly on the LED substrate. This type of conventional ribbon connector takes up considerable space, resulting in the optical lensing elements having to be placed further from the LED substrate, thus reducing the optical efficiency of the lamp. Also, such a conventional ribbon connector takes up space that could be utilized for various sensing elements such as thermistors, photodiodes, etc. Furthermore, the connecting wiring extending between such a conventional ribbon connecter and the PCB driver circuit (for driving the LEDs) would have to run off the LED substrate down to the PCB, potentially impeding fan cooling of the assembly when the lamp is in use. Finally, the typical LED-based lamp is designed so that the array of LEDs on the LED substrate is driven by a single PCB driver circuit. This limits the precision of the control for the LED array when a large number of LEDs is present. Such a design is also not suitable for multi-wavelength LED arrays where LEDs of different wavelengths may have different operating characteristics.

With the present invention, the electrical connection of LEDs 140 to a PCB driver circuit (located in housing section 110) is achieved using flexible polyimide substrates 135. Two polyimide substrates 135 are guided into their correct positions on aluminum block 120 of heat sink 115 via four dowel pins 145 inserted vertically into the top surface of aluminum block 120 of heat sink 115 (see FIGS. 3 and 4). Flexible polyimide substrates 135 can be attached to the top surface of aluminum block 120 of heat sink 115 by double-sided adhesive tape, glue, thermal pads or by mechanical force, etc.

Flexible polyimide substrates 135 are designed so that their solder pads 150 (FIG. 4) are matched with the solder pads 155 (FIGS. 2B and 2C) on LED substrate 130 so that they can be electrically connected via a soldering process. Each pair of connections between solder pads 150, 155 provides current to a chain of LEDs 140 from their own driver circuit. In the example shown in FIG. 4, there are 4 chains of 10 LEDs each driven by an independent driver circuit located on a PCB located within housing section 110 of LED lamp 100. This design can be scaled up or down to include more or less LED chains and more or less driver circuits. This design can also be used for multi-wavelength configurations (i.e., different driver circuits can be provided for different chains of LEDs, each of which may produce light of different wavelengths). By utilizing a multi-driver design, the balance of the currents associated with smaller LED chains can be controlled more precisely. The thin form factor of flexible polyimide substrates 135 minimizes the connection height and connection paths in the system. Flexible polyimide substrates 135 are designed to run down the sides of the lamp and connect to the PCB (located in housing section 110) via connectors (see below). In this way, flexible polyimide substrates 135 do not obstruct the air flow of the cooling fans when the lamp is in operation.

In addition to providing electrical connection of LEDs 140 to the PCB driver circuits, flexible polyimide substrates 135 also host a number of various sensing elements. In one preferred form of the invention, and looking now at FIG. 4, flexible polyimide substrates 135 comprise two photodiodes 160, a thermistor 165 and a resistor 170. The two photodiodes 160, thermistor 165 and resistor 170 are embedded on flexible polyimide substrates 135, enabling adjustment to correct for LED degradation due to high temperature effects and/or LED aging, whereby to maintain the same light brightness and uniformity over changing conditions. More particularly, thermistor 165 measures the temperature at the surface of a flexible polyimide substrate 135. Resistor 170 on flexible polyimide substrate 135 detects a reverse polarity. The pair of flexible polyimide substrates 135 are designed to support opposite polarity LEDs. If a different polarity is required, the flexible polyimide substrates 135 are simply rotated 180° and switch sides on the top surface of aluminum block 120 of heat sink 115. The first photodiode 160 measures the intensity of the light emitted by LEDs 140 at the surface of LED substrate 130. The second photodiode 160 measures the intensity of the light at the surface of the removable outer (exit) window (see below).

Figure 5:
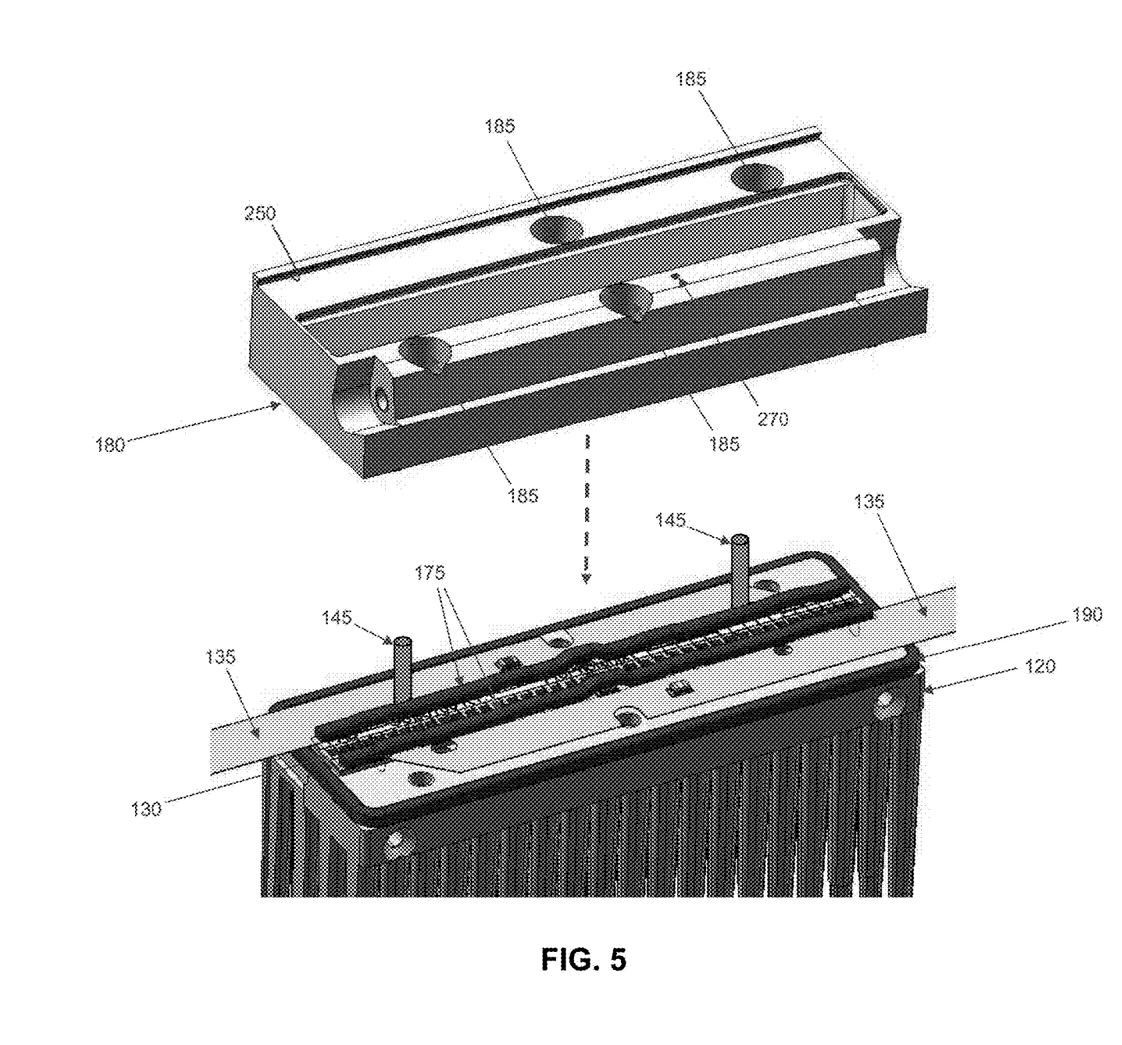
FIG. 5 is an exploded view showing how a reflector is mounted atop the construction shown in FIGS. 3 and 4.

Looking now at FIG. 5, silicone cords 175 are positioned on flexible polyimide substrates 135, covering the locations where the flexible polyimide substrates and LED substrate 130 are soldered together and where the various sensing elements (e.g., the two photodiodes 160, thermistor 165 and resistor 170) are located close to the LED substrate. The function of the two silicone cords 175 is to provide protection to the two flexible polyimide substrates 135 when a reflector 180 is mounted onto aluminum block 120 of heat sink 115. Reflector 180 is guided into its correct position on aluminum block 120 of heat sink 115 via dowel pins 145 inserted vertically into aluminum block 120 of heat sink 115.

Figure 6:
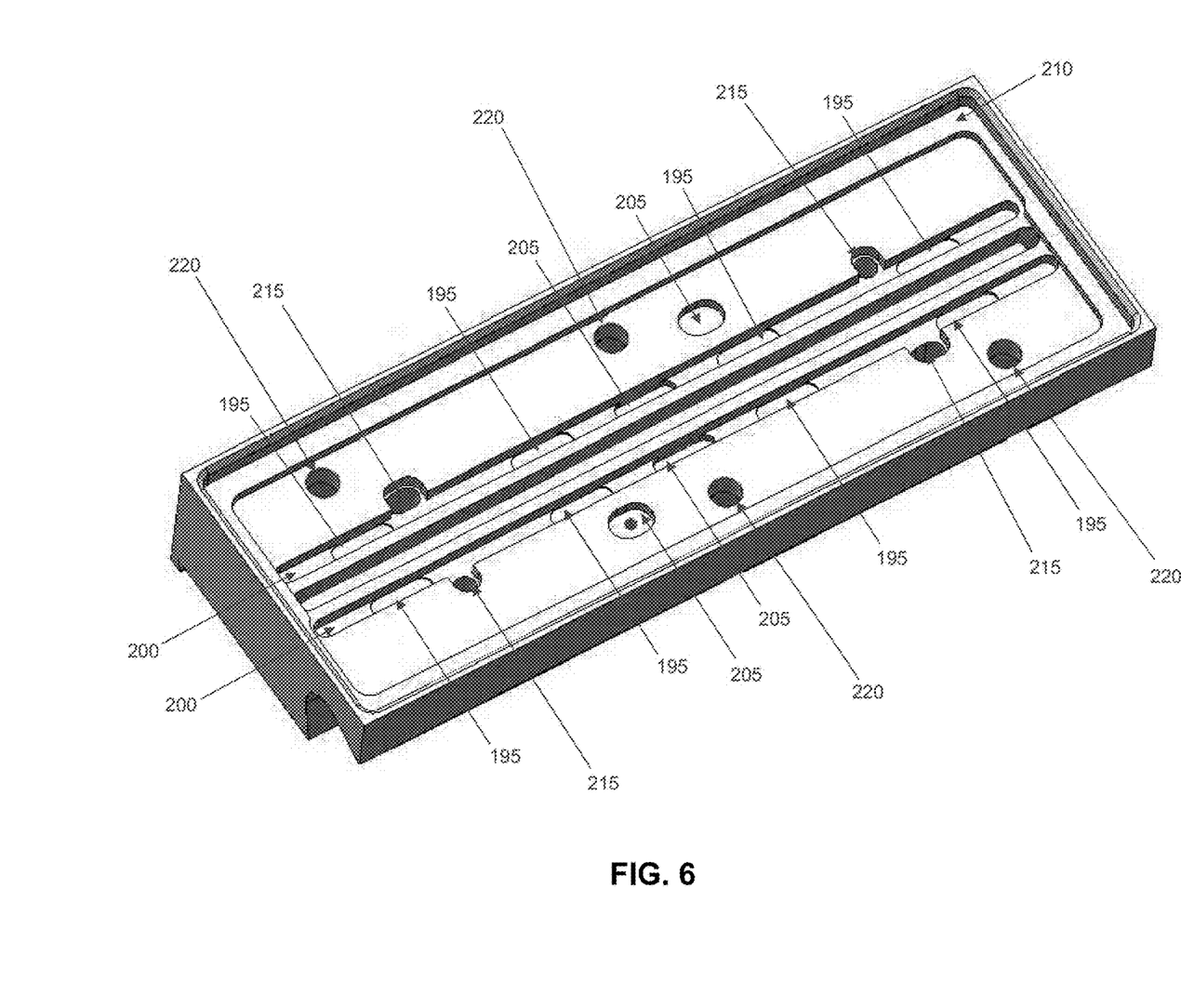
FIG. 6 is a bottom view of the reflector shown in FIG. 5.

Looking next at FIGS. 5 and 6, reflector 180 is attached directly to aluminum block 120 of heat sink 115 by four screws 185. The outer circumference of reflector 180 sits on an O-ring 190 disposed about the outer circumference of aluminum block 120 of heat sink 115. O-ring 190 is placed directly between the interfaces of reflector 180 and aluminum block 120 of heat sink 115, providing a hermetic seal to protect the non-encapsulated LEDs 140. As seen in FIG. 6, the bottom of reflector 180 comprises cutouts to accommodate the various elements carried by aluminum block 120 of heat sink 115, e.g., cutouts 195 to accommodate solder pads 150, cutouts 200 to accommodate silicone cords 175, cutouts 205 to accommodate sensors 160, 165, 170, cutout 210 to accommodate O-ring 190, blind holes 215 to accommodate dowel pins 145 on aluminum block 120 of heat sink 115, and holes 220 to accommodate screws 185 for securing window assembly 180 to aluminum block 120 of heat sink 115.

Figure 7:
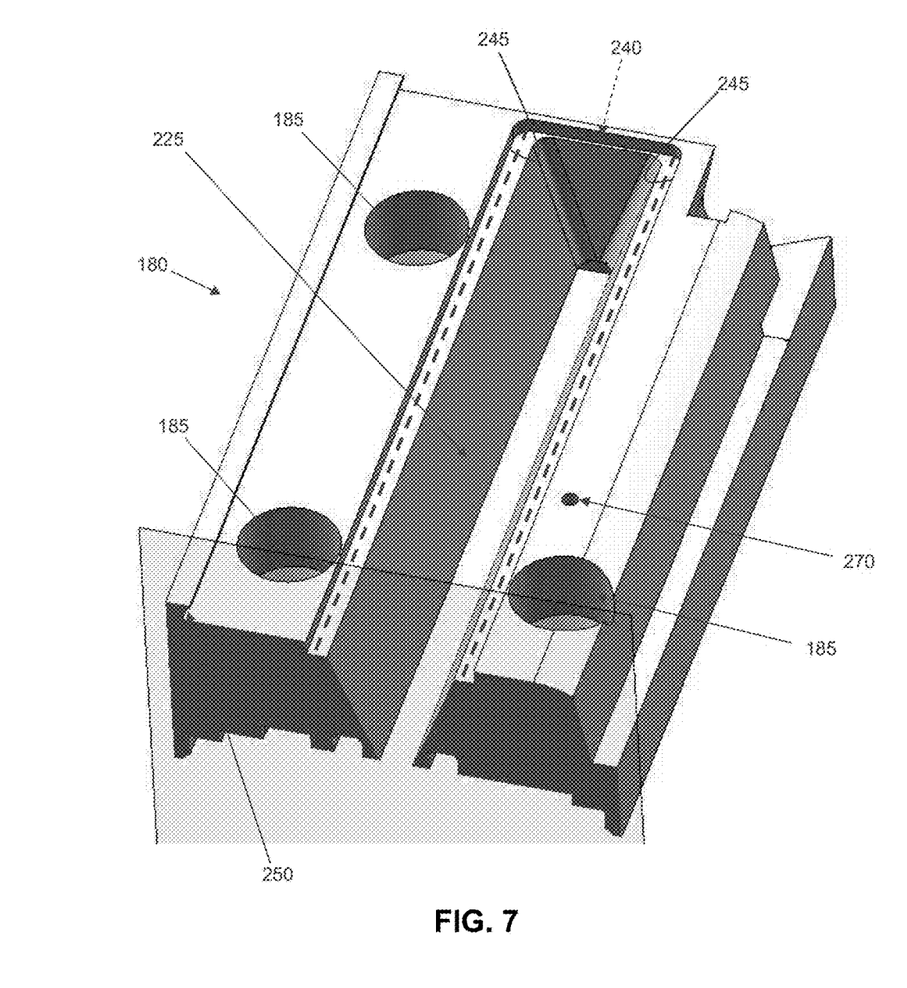
FIG. 7 is a schematic view showing details of the reflector.
Figure 8A:
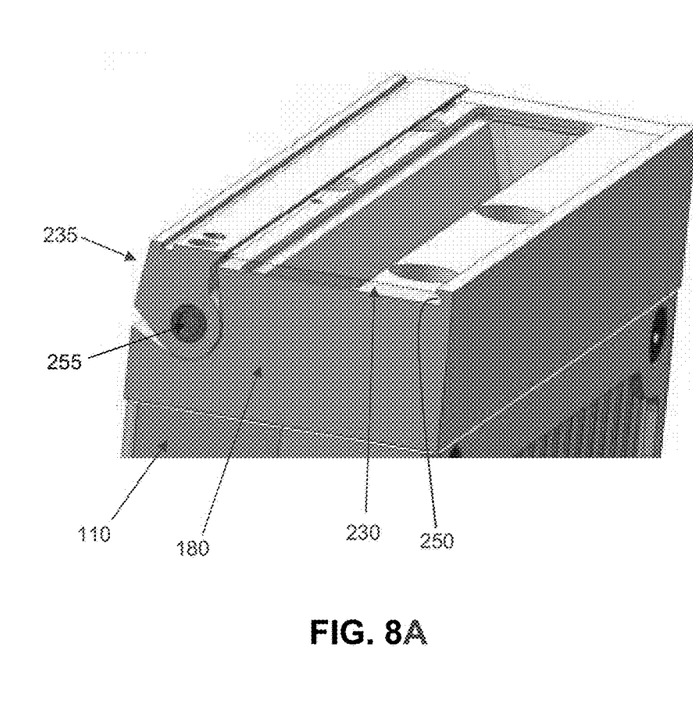
FIGS. 8A and 8B are schematic views showing how a hinged clamp is used to releasably mount a removable outer (exit) window to the reflector.
Figure 8B:
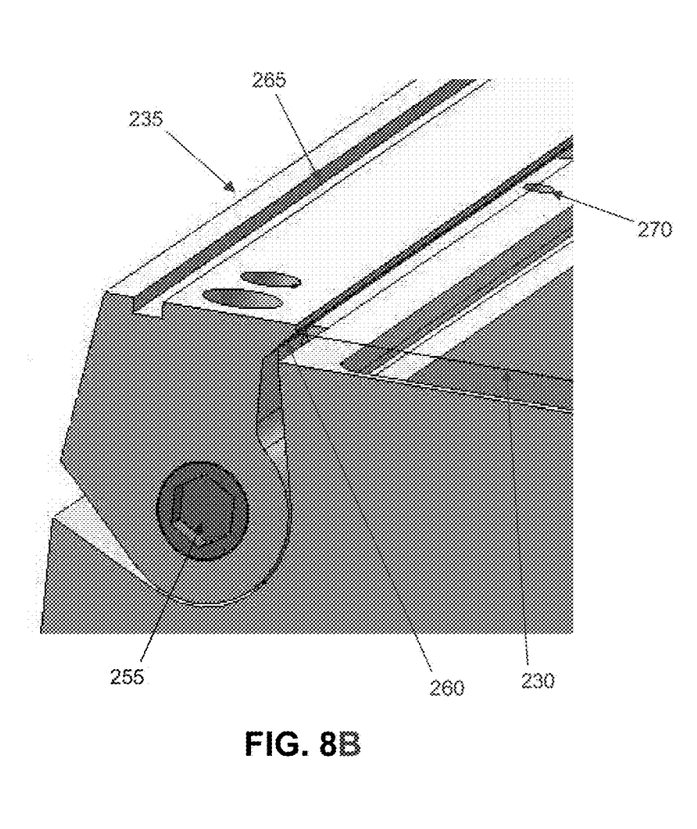
Figure 9A:
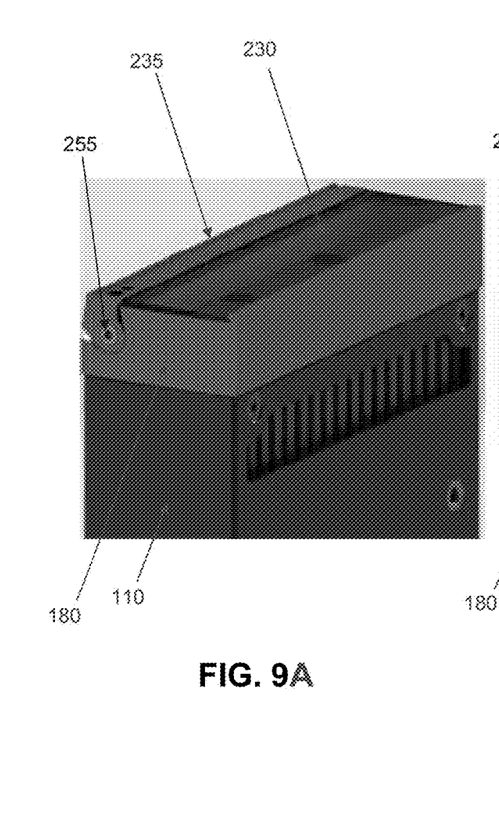
FIGS. 9A, 9B and 9C are schematic views showing how a removable outer (exit) window is removed from the reflector.
Figure 9B:
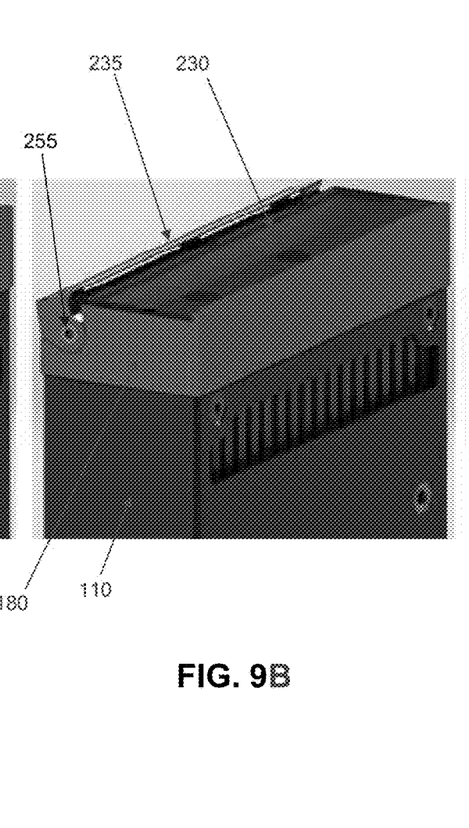
Figure 9C:
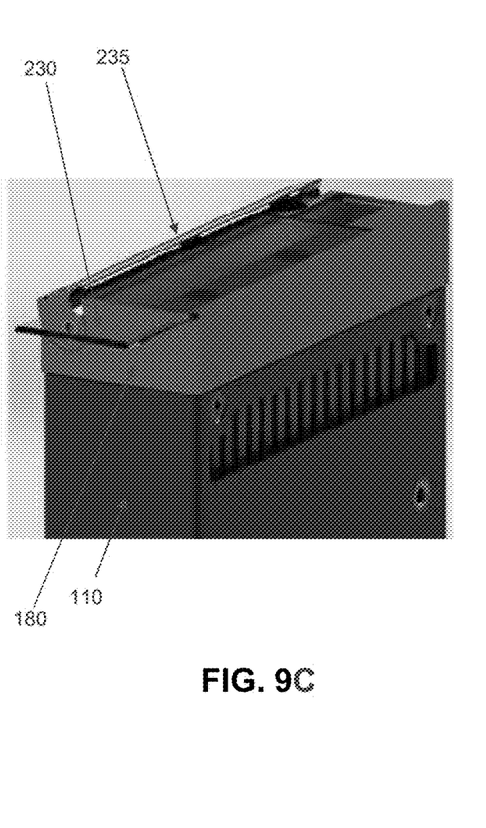

Looking next at FIGS. 7-9, reflector 180 comprises a reflector chamber 225 (FIG. 7), an removable outer (exit) window 230 (FIG. 8), and a hinged clamp 235 (FIGS. 7, 8 and 9). Reflector 180 can be made out of metal (e.g., aluminum), plastic, etc. by techniques such as milling, drop forging, injection molding or die casting. The depth and angle of reflector chamber 225 will depend on the optical output required (intensity, working distance, shape, etc.). Reflector chamber 225 can be coated in chrome or other suitably reflective material to improve reflectivity. In one form of the invention, LEDs 140 are not encapsulated and are instead hermetically sealed from the environment by a fixed inner window 240. If desired, a light bar (not shown) may be placed in front of LEDs 140 at a predetermined distance to produce collimated light. It will be appreciated by those skilled in the art that other optical configurations possible.

In the construction shown in FIGS. 7, 8A, 8B and 9, reflector 180 carries two windows made of, for example, borosilicate, quartz, BK7, etc., i.e., the permanently fixed inner window 240 glued onto an inner window undercut 245 (FIG. 7), and the removable outer (exit) window 230. The permanently fixed inner window 240 allows the LED light to pass through while providing a hermetic seal to LEDs 140. The removable outer (exit) window 230 (FIGS. 8A, 8B and 9) is positioned in a window-retaining undercut 250 (FIGS. 7, 8A and 8B) and selectively held in place by hinged clamp 235.

Hinged clamp 235 effectively serves as a window securing/releasing mechanism for the removable outer (exit) window 230. Looking now at FIGS. 8A, 8B and 9, hinged clamp 235 is pivotally attached to reflector 180 by suitable fastening screws 255. Hinged clamp 235 comprises a toe portion 260 adapted to clamp removable outer (exit) window 230 to reflector 180. Hinged clamp 235 is spring-loaded and, in its natural or "resting" position, clamps tightly against removable outer (exit) window 230. Removable outer (exit) window 230 is removed from reflector 180 by pulling back hinged clamp 235 and sliding removable outer (exit) window 230 from window-retaining undercut 250 as shown in FIG. 9. A slot grip 265 (FIG. 8B) which receives an insert grip (not shown) may be provided on hinged clamp 235 to provide gripping aides for the user.

Figure 10A:
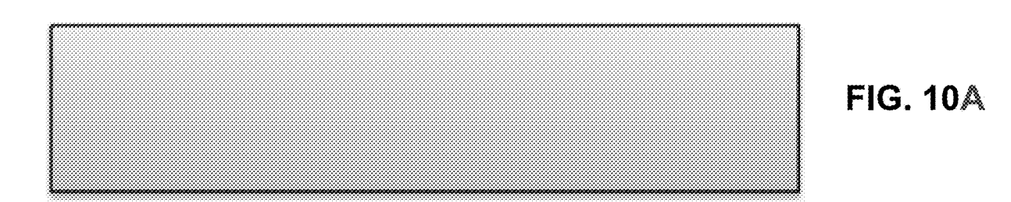
FIGS. 10A, 10B, 10C and 10D are schematic views showing an outer (exit) window with various patterns of build-up on the outer surface of the outer (exit) window.
Figure 10B:
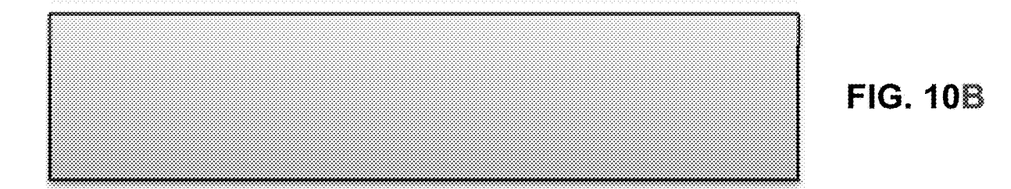
Figure 10C:
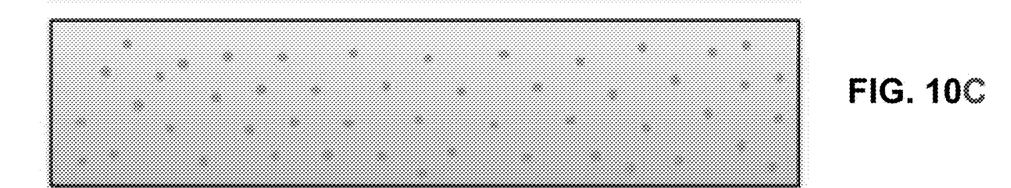
Figure 10D:
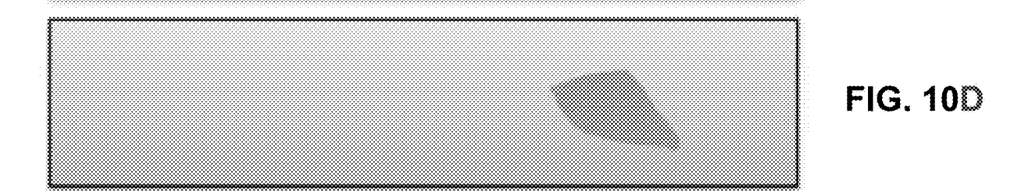

As discussed above, it is desirable to provide a sensor to detect excessive build-up of material on the surface of removable outer (exit) window 230. This is made challenging, however, due to the limited space available to position a sensor (or sensors) on LED substrate 130. Furthermore, the material building up on removable outer (exit) window 230 can have different characteristics depending on the user application. For example, a removable outer (exit) window 230 may start out clear (FIG. 10A) and, in one application, you could have a relatively uniform build-up of material across removable outer (exit) window 230 (FIG. 10B). In this case, utilizing a single photodiode to measure the change in light transmission through removable outer (exit) window 230 would be sufficient. However, it is possible to have a randomly distributed set of material spots across removable outer (exit) window 230 (FIG. 10C). In this case, it would be necessary to have numerous photodiodes to measure the change in light transmission through removable outer (exit) window 230. This is not very practical and could add significant cost to the lamp. A further issue arises if there is a build-up of material on removable outer (exit) window 230 at one particular location (FIG. 10D). A single photodiode response might not pick this up even though the build-up at one particular location could have a significant effect on the lamp's operational effectiveness. What is needed, therefore, is a novel technique that minimizes the need for multiple photodiodes and accurately measures the build-up of material on the outer surface of removable outer (exit) window 230.

In a typical LED-based system, light is produced by the LEDs. The light passes through, or interacts with, some optical elements (e.g., lenses, reflectors, etc.) and exits through an outer (exit) window. It is well known that 100% transmission of light does not occur at the outer (exit) window, inasmuch as some light is reflected back into the system.

In accordance with the present invention, it has been recognized that, in addition to a portion of the light entering outer (exit) window 230 being reflected back into the system, a portion of the light entering the outer (exit) window will be internally reflected and travel to the edge of the outer (exit) window. If material (e.g., inks, adhesives, polymers, coatings, etc.) become deposited on the outer surface of the outer (exit) window, more light will be reflected back into the outer (exit) window, and more light will be internally reflected and travel to the edge of the outer (exit) window. Therefore, where more material is deposited on the outer surface of outer (exit) window 230, more reflections will travel to the edges of the outer (exit) window.

The present invention takes advantage of this fact, by monitoring the amount of light that is reflected to an edge of the removable outer (exit) window 230 in order to determine the amount of material which has become deposited on the outer surface of the window.

Figure 11:
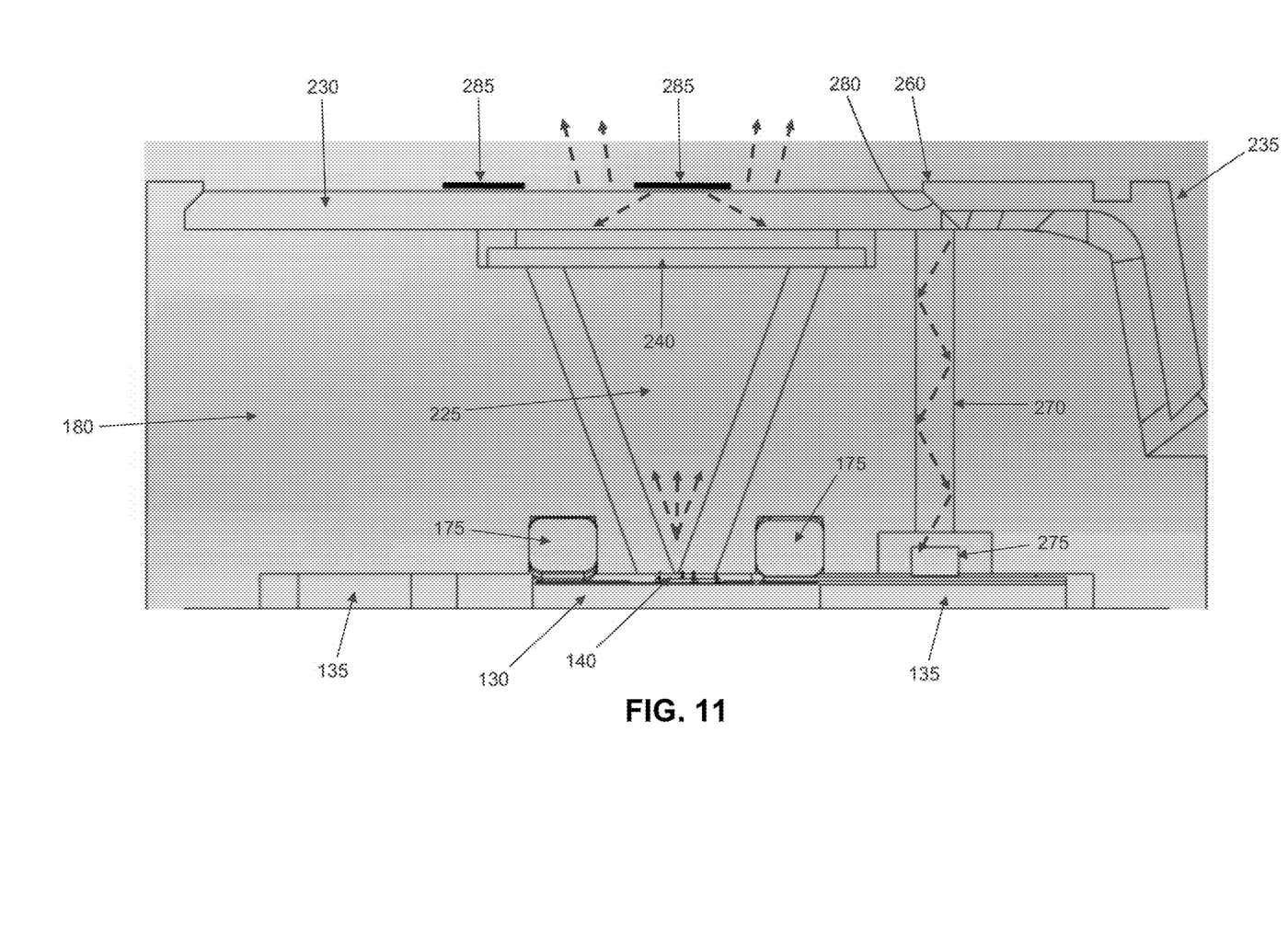
FIG. 11 is a schematic view showing how build-up on the outer surface of the outer (exit) window may be detected.

More particularly, with the present invention, and looking now at FIG. 11, the light that travels to one of the edges of removable outer (exit) window 230 is coupled into a light pipe 270 (e.g., a chrome-coated through-hole) and directed toward a photodiode 275. In this case, removable outer (exit) window 230 is chamfered at its edges so that it rests perfectly against a reflective surface 280 of hinged clamp 235. Reflective surface 280 of hinged clamp 235 acts as a mirror to reflect light from the edge of removable outer (exit) window 230 into light pipe 270. Light pipe 270 can be filled with silicone or other similar optically-transparent material to hermetically seal the LEDs. With the present invention, if removable outer (exit) window 230 is covered with a material (e.g., a contaminant 285), the internal reflections within removable outer (exit) window 230 increase, leading to an increase in the amount of light coupled into light pipe 270 and picked up by photodiode 275. The advantage of this approach is that the light entering light pipe 270 is an amalgamation of the various reflections happening at removable outer (exit) window 230 and, as such, is independent of where, and how, the material is deposited on the outer surface of removable outer (exit) window 230—in other words, the amount of light directed to photodiode 275 is not dependent on a particular build-up pattern on removable outer (exit) window 230. A threshold build-up level can be set by a user in the lamp such that, when this threshold build-up level is reached (i.e., when the output of photodiode 275 reaches a predetermined level), the user is notified that removable outer (exit) window 230 should be replaced in order to ensure that the LED lamp will still work effectively. This notification can be sent to the user via a software protocol or through the lamp itself (e.g., by flashing an indicator LED).

Figure 12A:
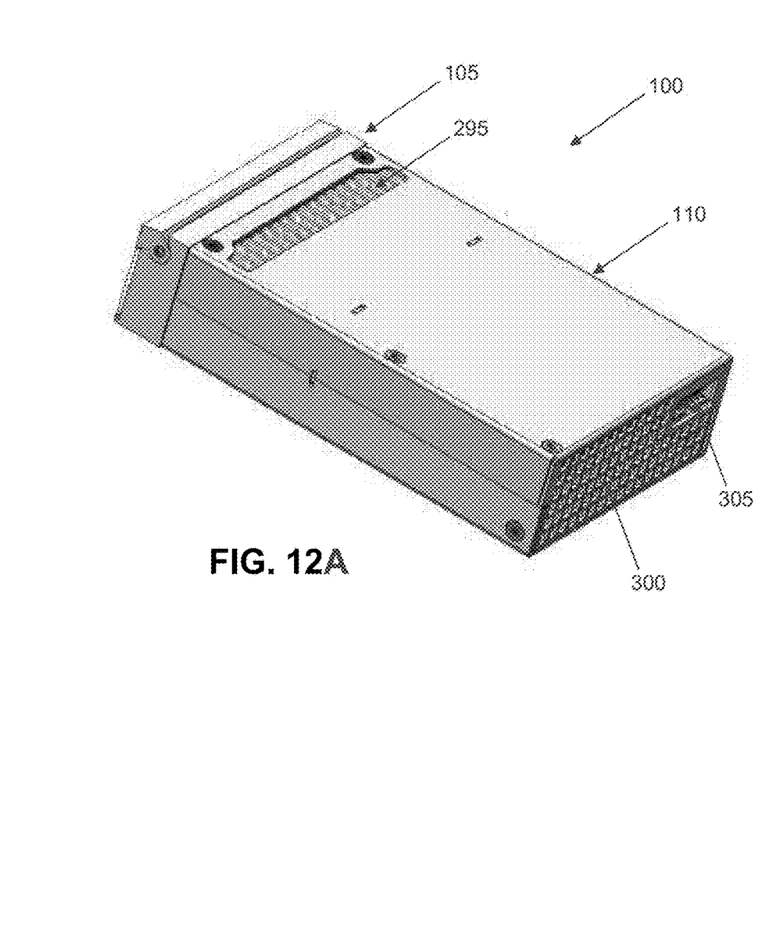
FIGS. 12A and 12B are schematic views showing further aspects of the novel LED lamp of the present invention.
Figure 12B:
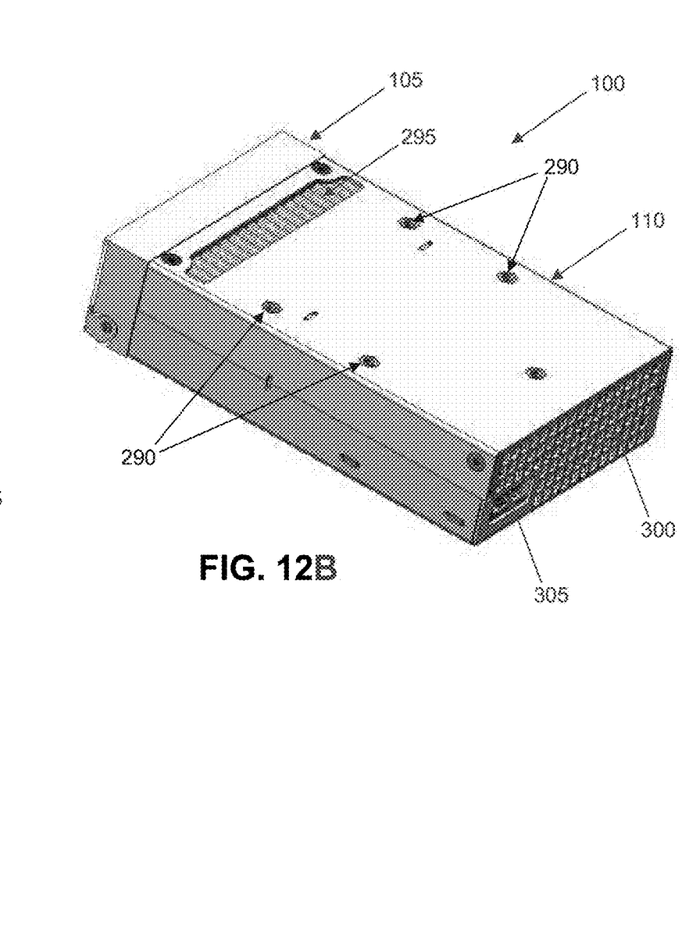

LED lamp 100 is preferably rectangular in nature but can be any shape. FIGS. 12A and 12B show an exemplary configuration for LED lamp 100. Housing section 110 can have a number of mounting holes 290 for securing LED lamp 100 to a user-provided mount. Housing section 110 preferably also has openings 295 that allow air to be exhausted from the interior of housing section 110. The rear of housing section 110 preferably comprises an open grid 300 with an opening for an electrical connector 305. Open grid 300 allows for air intake into housing section 110. Housing section 110 preferably comprises means to hold components inside housing section 110. The inside of LED lamp 100 comprises an electronic driver board (which includes the aforementioned PCB driver circuit for driving the LEDs), and one or more fans for drawing fresh air into open grid 300 and circulating the air through the interior of housing section 110 before exhausting through openings 295. To secure the fan(s) in place, the fan(s) can be mounted in a fan rack. The fan rack can be secured into the housing through a series of slots in the lamp housing. The fans can be riveted into the fan rack. The components are preferably arranged such that the electronic driver board is placed near open grid 300. The incoming air passes over the electronic driver board, cooling the PCB driver circuits by the adjacent fan(s).

Novel aspects of the present invention include, but are not limited to:
  the novel header section which comprises a removable outer (exit) window;
  placing sensors near the LED substrate while maximizing optical efficiency;
  measuring of the intensity of light at the side edges of the removable outer (exit) window to determine the amount of material built up on the outer surface of the removable outer (exit) window; and
  the hermetic sealing of LEDs (instead of conventional LED encapsulation).

Advantages of the present invention include, but are not limited to:

an outer (exit) window which is easily replaceable;
integration of sensing elements adjacent the LED substrate; and
the provision of means for determining the build-up of material on the outer surface of the outer (exit) window.

Modifications of the Preferred Embodiments

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A novel LED lamp comprising:
   a lamp body;
   an LED mounted to the lamp body;
   an outer (exit) window comprising an edge surface;
   a photodetector;
   a light pipe for transmitting light from the edge surface of the outer (exit) window to the photodetector; and
   a hinged clamp for releasably mounting the outer (exit) window to the lamp body such that light emitted from the LED passes through the outer (exit) window;
   wherein the lamp body comprises a heat sink and a reflector mounted to the heat sink, wherein the LED is mounted to the heat sink, and wherein the hinged clamp is mounted to the reflector.

2. A novel LED lamp according to claim 1 further comprising a fixed inner window mounted to the reflector between the LED and the outer (exit) window.

3. A novel LED lamp according to claim 1 wherein the LED is mounted to a substrate, and further wherein the substrate is mounted to the heat sink.

4. A novel LED lamp according to claim 3 further comprising an electronic driver circuit for driving the LED, and further wherein a flexible polyimide connector is used to connect the LED to the electronic driver circuit.

5. A novel method for producing light, the novel method comprising:
   providing a novel LED lamp comprising:
      a lamp body;
      an LED mounted to the lamp body;
      an outer (exit) window comprising an edge surface;
      a photodetector;
      a light pipe for transmitting light from the edge surface of the outer (exit) window to the photodetector; and
      a hinged clamp for releasably mounting the outer (exit) window to the lamp body such that light emitted from the LED passes through the outer (exit) window;
      wherein the lamp body comprises a heat sink and a reflector mounted to the heat sink, wherein the LED is mounted to the heat sink, and wherein the hinged clamp is mounted to the reflector; and
   driving the LED so that it emits light.

6. A method according to claim 5 further comprising:
   using the photodetector and the light pipe to detect the build-up of contaminants on the outer (exit) window.

7. A method according to claim 6 further comprising removing the outer (exit) window from the lamp body when a build-up of contaminants is detected.

8. A method according to claim 7 further comprising remounting an outer (exit) window to the lamp body.

9. A method according to claim 5 wherein the LED lamp further comprises a fixed inner window mounted to the reflector between the LED and the outer (exit) window.

10. A method according to claim 5 wherein the LED is mounted to a substrate, and further wherein the substrate is mounted to the heat sink.

11. A method according to claim 10 wherein the LED lamp further comprises an electronic driver circuit for driving the LED, and further wherein a flexible polyimide connector is used to connect the LED to the electronic driver circuit.

* * * * *